United States Patent
Bauer et al.

(10) Patent No.: US 8,262,521 B2
(45) Date of Patent: Sep. 11, 2012

(54) TENSIONER ASSEMBLY COMPRISING A DISPLACEABLE TENSIONING RAIL

(75) Inventors: Christian Bauer, München (DE); Heiner Hegering, Garching (DE)

(73) Assignee: iwis motorsysteme GmbH & Co. KG, Munich (DE)

( * ) Notice: Subject to any disclaimer, the term of this patent is extended or adjusted under 35 U.S.C. 154(b) by 625 days.

(21) Appl. No.: 12/422,526

(22) Filed: Apr. 13, 2009

(65) Prior Publication Data

US 2009/0264232 A1    Oct. 22, 2009

(30) Foreign Application Priority Data

Apr. 22, 2008    (DE) .................. 10 2008 020 161

(51) Int. Cl.
F16H 7/08    (2006.01)
F16H 7/22    (2006.01)
F16H 7/10    (2006.01)
F16H 7/18    (2006.01)

(52) U.S. Cl. ......... 474/111; 474/101; 474/109; 474/140
(58) Field of Classification Search .................. 474/101, 474/109, 111, 140
See application file for complete search history.

(56) References Cited

U.S. PATENT DOCUMENTS

| | | | | |
|---|---|---|---|---|
| 2,191,946 A * | 2/1940 | Weller | ............ | 474/111 |
| 2,261,316 A * | 11/1941 | Weller | ............ | 474/111 |
| 2,717,520 A * | 9/1955 | Imse | ............ | 474/111 |
| 2,953,822 A * | 9/1960 | Schiltknecht | ............ | 19/250 |
| 3,057,218 A * | 10/1962 | Knerr et al. | ............ | 474/2 |
| 3,086,403 A * | 4/1963 | Knerr et al. | ............ | 474/87 |
| 4,395,250 A * | 7/1983 | King | ............ | 474/111 |
| 4,505,691 A * | 3/1985 | Kohler | ............ | 474/101 |
| 5,776,024 A * | 7/1998 | White et al. | ............ | 474/110 |
| 5,868,638 A * | 2/1999 | Inoue et al. | ............ | 474/110 |
| 5,989,138 A * | 11/1999 | Capucci | ............ | 474/109 |
| 6,312,353 B1 | 11/2001 | Oba | | |
| 6,585,614 B1 * | 7/2003 | Kumakura | ............ | 474/111 |
| 2009/0098965 A1 | 4/2009 | Schuseil et al. | | |

FOREIGN PATENT DOCUMENTS

| | | |
|---|---|---|
| DE | 196 07 819 A1 | 9/1997 |
| DE | 297 19 734 U1 | 4/1999 |
| DE | 10 2005 033 322 A1 | 1/2007 |
| EP | 0 892 193 A1 | 1/1999 |
| JP | 2007/218189 A1 | 8/2007 |
| WO | WO 2007/124986 A1 | 11/2007 |

* cited by examiner

Primary Examiner — William A Rivera
Assistant Examiner — Henry Liu
(74) Attorney, Agent, or Firm — Leydig, Voit & Mayer, Ltd.

(57) ABSTRACT

The invention relates to a tensioner assembly for a traction medium drive, specifically a chain drive, with at least two traction medium wheels and a flexible traction medium, comprising a tensioning rail which can be pressed against the traction medium by means of a tensioning device, wherein the tensioning rail is applied against at least one sliding guide and can be displaced along the at least one sliding guide by means of the tensioning device.

6 Claims, 4 Drawing Sheets

TENSIONER ASSEMBLY COMPRISING A DISPLACEABLE TENSIONING RAIL

Figure 1:
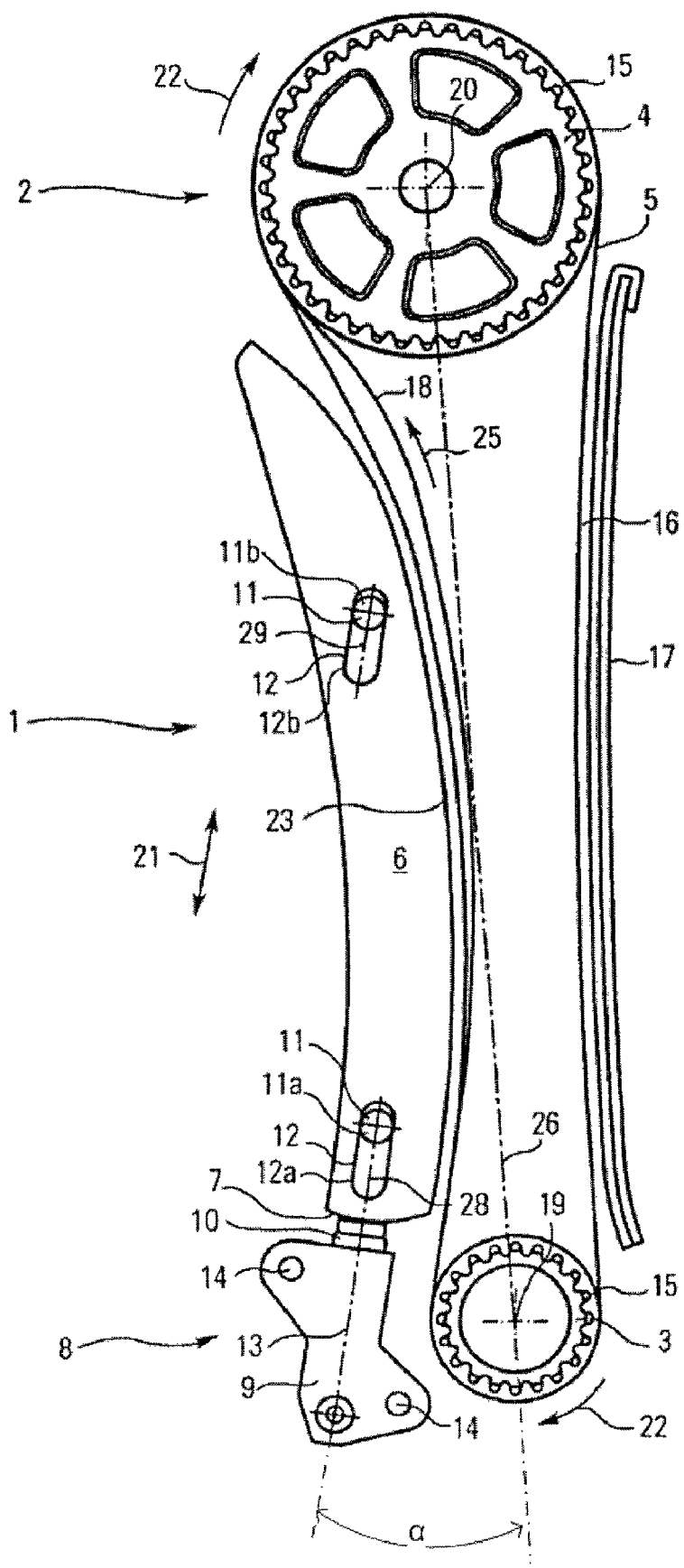

The present invention relates to a tensioner assembly for a traction medium drive, specifically a chain drive, with at least two traction medium wheels and a flexible traction medium, comprising a tensioning rail which can be pressed against the traction medium by means of a tensioning device.

Tensioner assemblies of this type are employed, for example, to tension the valve train or drive of ancillary components of internal combustion engines. Such tensioner assemblies can be used for both chain and belt drives. Disturbing vibrations and premature wear can thus be reduced.

A generic tensioner assembly is known from DE 29719734 U1. A tensioning rail, which is used to apply a tension force to a chain drive, is rotatably fixed at one end. The fixing point defines the pivot axis, about which the tensioning rail is moved when a load is introduced by the chain tensioner mounted on the opposite end. The tensioning piston of the chain tensioner presses via a press-on ball onto the press-on surface of the tensioning rail. The press-on surface is formed to allow the initiation of a pivoting movement of the tensioning rail, regardless of the mechanically unfavorable arrangement of the chain tensioner. The disadvantage thereof resides in that the tensioner assembly has to be adapted to the respective requirements when employed in other engines. To ensure a reliable movement of the tensioning rail, the press-on ball of the tensioning piston as well as the press-on surface of the tensioning rail have to be adapted to one another.

Therefore, it is the object of the present invention to improve a generic tensioner, in order to obtain a tensioning concept which is versatile and easy to adapt to the respective assembled situation.

To this end, it is provided by the invention that the tensioning rail of a generic tensioner assembly is applied against at least one sliding guide and can be displaced along the at least one sliding guide by means of the tensioning device. The sliding guide may be disposed in the area of the traction medium drive. There are no restrictions to the choice of the respective position of the sliding guide. Moreover, as no pivoting movement is required, a complicated adjustment between tensioning device and press-on surface of the tensioning rail is not necessary either.

According to a further development of the tensioner assembly it may be provided that the tensioning rail comprises an operating surface and the tensioning device comprises a housing and a tensioning piston, and that the tensioning piston acts on the operating surface. Such chain tensioners comprising a tensioning piston have proved to be reliable, and their production is easy and cost-efficient. Due to the small construction space and the easy exchange of damaged chain tensioners they are preferred to other conceivable tensioning concepts.

According to a modification the tensioning rail may comprise at least one guide contour, which interacts with the at least one sliding guide. The guide contour allows a restricted guidance of the tensioning rail. Furthermore, it is possible to reduce the friction occurring between the sliding guide and the tensioning rail by correspondingly designing the guide contour.

Another advantage is obtained if the tensioning device is disposed to extend the tensioning rail. This allows an optimum load introduction. Moreover, the narrow design of the tensioner helps to save construction space.

Also, it is possible to arrange the tensioning device in such a way that the direction of the movement of the tensioning piston deviates in an assembled position by a maximum of 30° from a connecting line between a first and second traction medium wheel, between which the tensioning rail is acting. The parallel orientation of the chain tensioner with respect to the chain drive allows a saving of construction space. Thus, an orientation according to the prior art, namely of the chain tensioner transversely with respect to the chain drive, i.e. with an extending movement of the tensioning piston towards the chain drive, is avoided. In the earlier prior art, such an arrangement of the chain tensioner frequently entailed problems with regard to the accommodation of the chain tensioner, so that the herein proposed arrangement is preferable.

Another advantage is obtained if the first traction medium wheel is smaller than the second traction medium wheel, if the tensioning device is arranged at the level of the first traction medium wheel and if, by extending the tensioning piston of the tensioning device out of the housing, the tensioning rail is pressed away from the first traction medium wheel in the direction of the second traction medium wheel. As the first traction medium wheel has a diameter which is smaller than that of the second traction medium wheel, the tensioning device can be accommodated next to the traction medium wheel at the level thereof. Thus, the disadvantage known from the previous prior art, namely that the tensioning device used to be arranged next to or in the proximity of the larger second traction medium wheel, is overcome. This constructional design had further increased the construction space necessary for the chain drive in the area of the second traction medium wheel, which is larger anyhow. Thus, by the herein proposed arrangement of the tensioning device and the first traction medium wheel, this problem is solved.

In addition, it can be provided that, in the assembled position, a displacement of the tensioning rail caused by an extending movement of the tensioning piston out of the housing corresponds to the direction of the movement of the traction medium running along the tensioning rail. If irregularities occur in the traction medium movement, e.g. impacts, these forces are transferred via the tensioning rail to the tensioning device and are compensated by the same.

Another advantageous embodiment of the tensioner is obtained if the at least one sliding guide is formed by a bolt. A sliding guide formed in such a way is versatile, easy to assemble, and it has very good guiding properties. In addition, bolts are easy to integrate in the engine body and represent a commonly used and proven structural component.

Under certain circumstances the tensioner assembly may also be constructed to have two sliding guides each extend through an oblong hole incorporated in the tensioning rail, with the first oblong hole being provided in the proximity of the tensioning device and the second oblong hole being provided away from the tensioning device. The use of oblong holes with sliding guides extending therethrough results in a very good guiding function. Moreover, the use of two oblong holes spaced away from each other has the advantage that a misalignment or incorrect positioning of the tensioning device during operation is nearly excluded. The oblong holes may be linear or curved.

It would be possible to orient the first and second oblong holes parallel to one another, which results in an ideal displacement of the tensioning rail. Thus, the longitudinal axes of the oblong holes extend parallel to one another.

The tensioner assembly may be developed further by designing the at least one sliding guide and at least one guide contour to make the tensioning rail follow a non-linear movement path as it slides along the sliding guide. This arrangement lengthens the work length of the tensioning rail, without adding to the construction space required therefor.

Also, it may be provided that the at least one guide contour and at least one sliding guide are designed to allow in the assembled position a combined movement of the tensioning rail parallel to the connecting line between a first and a second traction medium wheel and at right angles to the connecting line between the first and the second traction medium wheel in a ratio of 20:1 to 2:1. Thus, the tensioning rail can be displaced in parallel as well as approached to the traction medium.

Another advantageous embodiment can be achieved by orienting at least the first oblong hole parallel to the longitudinal axis of the tensioning piston, whereby the tensioning rail is guided in the longitudinal direction.

Moreover, it may be provided that the orientation of the second oblong hole with respect to the longitudinal axis of the tensioning piston deviates from that of the first oblong hole. Thus the tensioning rail is guided along a pivot axis, so that the tensioning rail can apply a greater load to the traction medium in the upper portion, i.e. in the portion being closer to the second traction medium wheel.

It may also be provided that the second oblong hole is inclined in the direction of the traction medium and that an angle defined between the longitudinal axis of the tensioning piston and the second oblong hole comes up to 90°. Such a tensioner additionally has the advantage that the construction space is reduced, while it is capable of applying a great tension load to the traction medium. The load of the tensioning piston is reliably transferred to the traction medium.

In order to achieve the object, it is further proposed to provide a tensioning rail, comprising an operating surface to press on a tensioning device and at least one guide contour to be applied against and slide along at least one sliding guide. Because of its properties, such a tensioning rail is specifically suited for use in internal combustion engines and requires only a small construction space.

Figure 2:
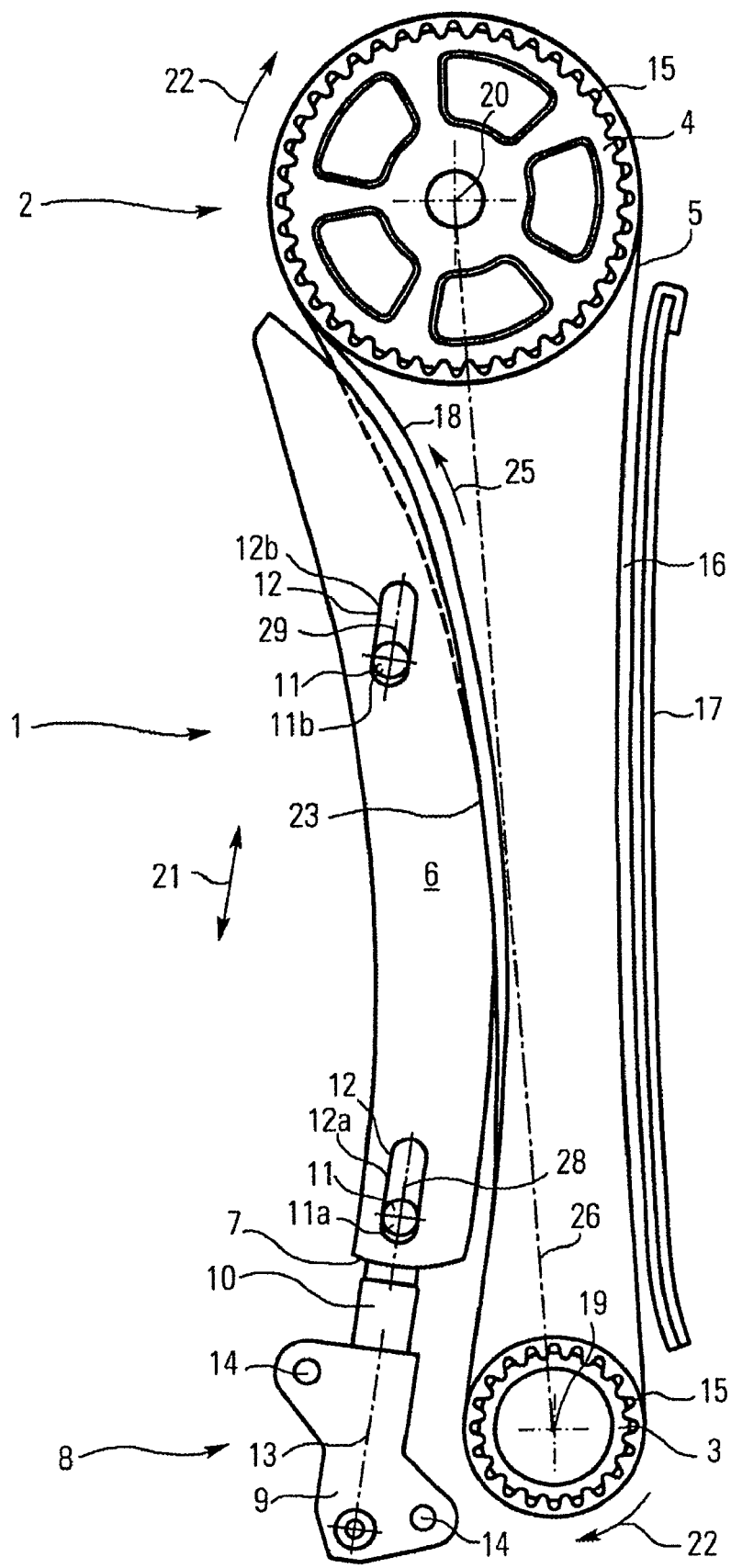
Figure 3:
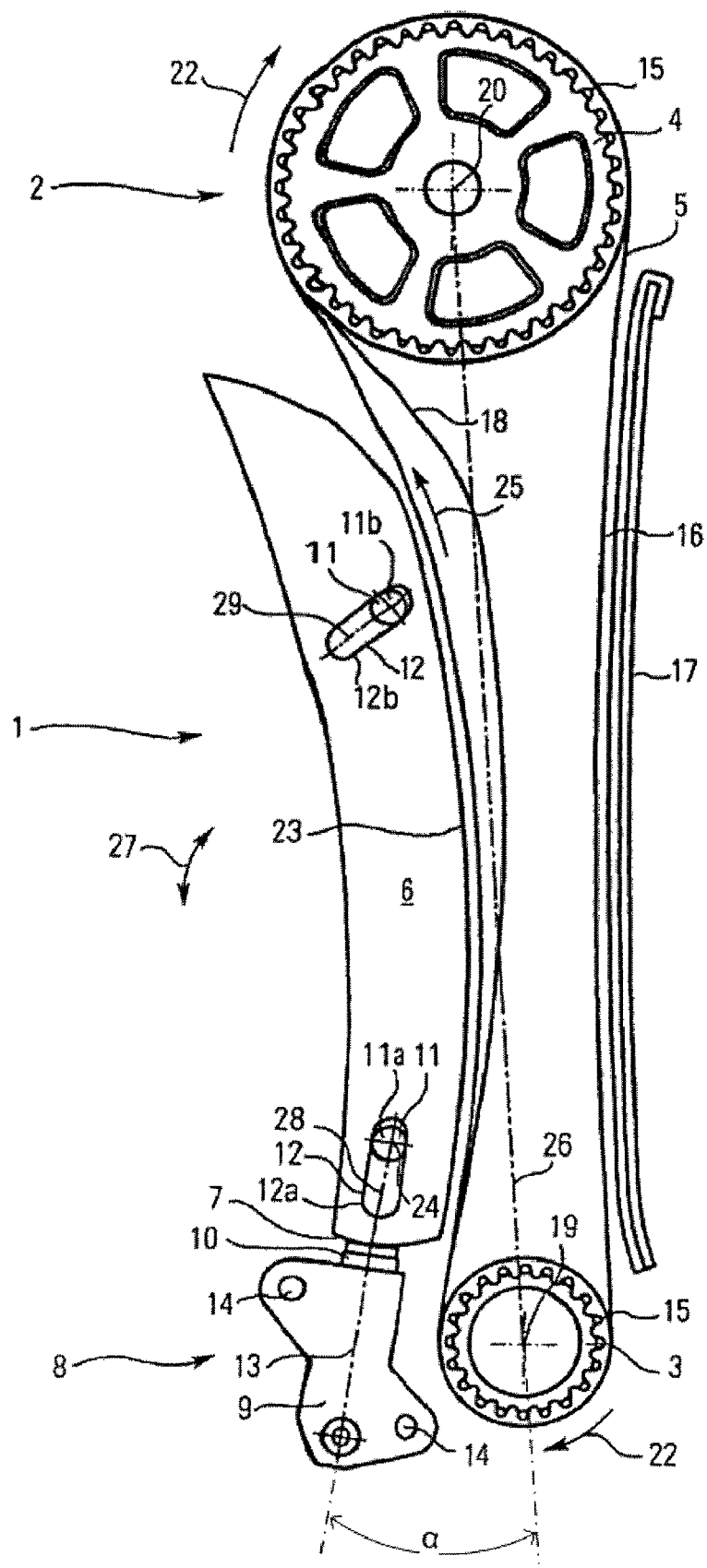
Figure 4:
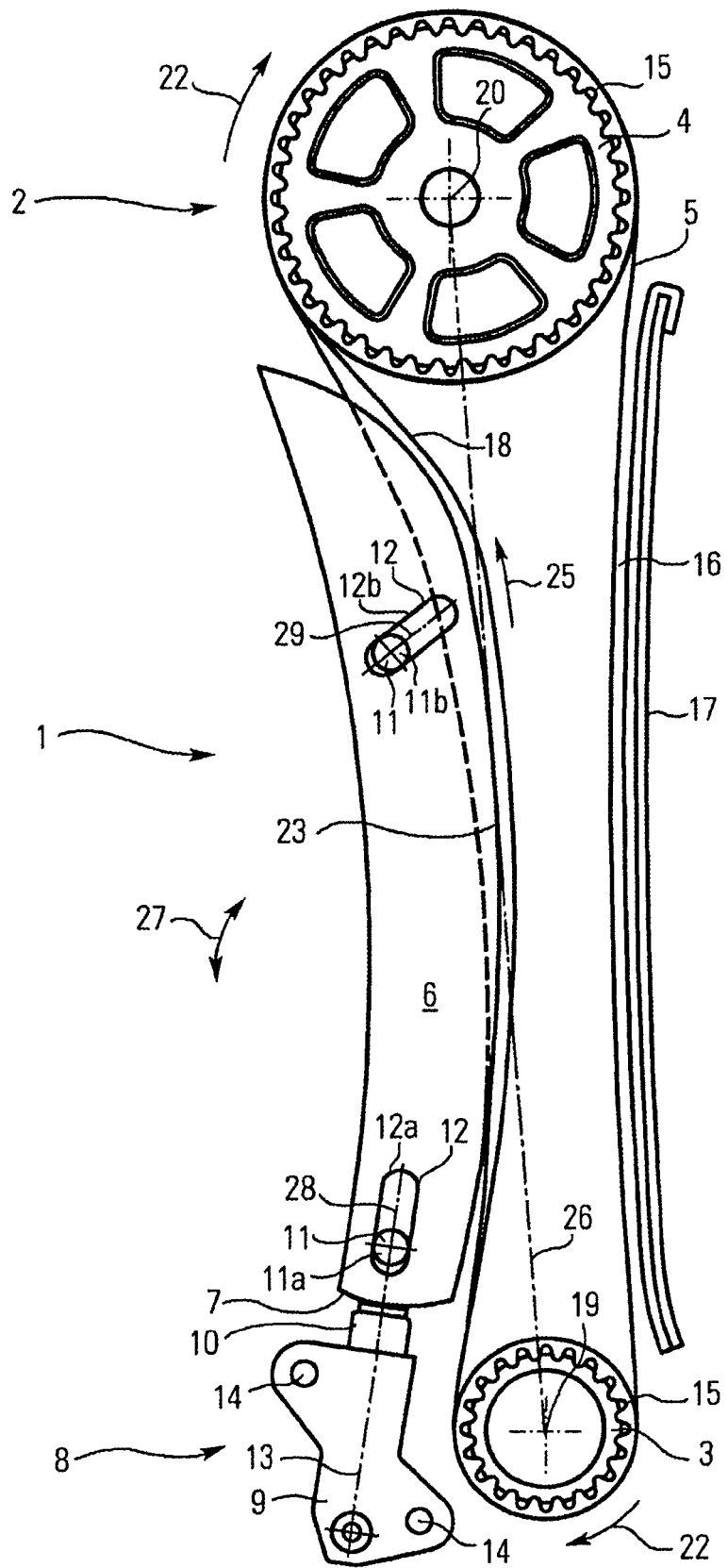

Below, the tensioner according to the invention shall be explained in more detail by means of the drawings. In the drawings:

FIG. 1 shows a schematic representation of a tensioner assembly according to the invention with a retracted piston, FIG. 2 shows a tensioner assembly according to FIG. 1 in its final position, FIG. 3 shows a tensioner assembly according to another embodiment with a retracted piston, FIG. 4 shows a tensioner assembly according to the other embodiment of FIG. 3 in its final position.

The tensioner assembly is substantially comprised of a tensioning rail 6 with a curved running surface 23 and a tensioning device 8. The tensioning device 8 is disposed to extend the tensioning rail 6. The tensioning piston 10 of the tensioning device 8 is in contact with the tensioning rail 6 via the operating surface 7. In the embodiment shown, the tensioning device 8 comprises a housing 9 in which the tensioning piston 10 is movably mounted. The housing 9 may be fixed to the crankcase or into the engine compartment via fixing points 14 or in any other way.

Beside the chain tensioner illustrated in the figures, which comprises a tensioning piston, also other tensioners may still be used, for example, leaf springs or torsion springs, respectively.

The tensioning rail 6 comprises two guide contours 12, with sliding guides 11 designed as bolts 11a, 11b extending therethrough. In the embodiment shown, the guide contours 12 are formed as oblong holes 12a, 12b spaced away from each other. The tensioning rail 6 is arranged along a traction medium drive 2, which runs around a lower first traction medium wheel 3 and an upper second traction medium wheel 4. The first traction medium wheel 3 is provided with a smaller number of teeth 15 and is arranged vertically underneath the second traction medium wheel 4. A chain guide 17 is arranged along the one traction medium section 16, which extends between the first and the second traction medium wheels 3 and 4. Next to the other traction medium section 18, which is likewise arranged between the first and second traction medium wheels 3 and 4, the tensioner 1 is arranged.

The first and second traction medium wheels 3, 4 each rotate about an axis 19, 20 in a direction of rotation 22, that is, clockwise. The axes 19, 20 are horizontally offset with respect to one another, so that the traction medium section 16 extends substantially vertically between the first traction medium wheel 3 and the second traction medium wheel 4. In correspondence to this, the traction medium section 18 extends between the smaller first traction medium wheel 3 and the larger second traction medium wheel 4 in an oblique, vertical manner.

The tensioning device 8 is an ordinary chain tensioner, which is conventionally used in motor vehicles. Thus, it may be operated merely by a spring force, but also by a spring force and an additional hydraulic pressure.

Moreover, it may comprise a locking device, which prevents an unintended retracting movement of the tensioning piston.

The tensioning device 8 is arranged parallel to the connecting line 26, next to the first traction medium wheel 3. This allows the arrangement of the tensioning rail 6 in the space between the chain wheels 3, 4 and provides for the possibility to have the tensioning rail 6 applied against substantially the total free length of the chain section 18. Moreover, there remains enough space to permit a displacement of the tensioning rail 6 along the chain section 18. Thus, in the embodiment shown, in the assembled position, the tensioning device 8 is arranged vertically underneath the tensioning rail 6, wherein the tensioning piston 10 exerts a pressure against the tensioning rail 6. The chain tensioning device 8 is arranged in such a way that the longitudinal axis 13 of the tensioning piston 10 deviates from the connecting line 26 between the first and second chain wheels by a maximum of 30°. By this, the tensioning device 8 and the tensioning rail 6 are already inclined in the direction of the free chain section 18, which improves the application of the tensioning rail 6 against the chain section 18. The longitudinal axis 13 of the chain tensioning device 8 defines the direction of the movement of the tensioning piston 10.

The tensioning device 8 is arranged parallel to the connecting line 26, next to the first traction medium wheel 3. This allows the arrangement of the tensioning rail 6 in the space between the chain wheels 3, 4 and provides for the possibility to have the tensioning rail 6 applied against substantially the total free length of the chain section 18. Moreover, there remains enough space to permit a displacement of the tensioning rail 6 along the chain section 18. Thus, in the embodiment shown, in the assembled position, the tensioning device 8 is arranged vertically underneath the tensioning rail 6, wherein the tensioning piston 10 exerts a pressure against the tensioning rail 6. The chain tensioning device 8 is arranged in such a way that the longitudinal axis 13 of the tensioning piston 10 deviates from the connecting line 26 between the first and second chain wheels by an angle, $\alpha$, as shown in FIGS. 1 and 3, which spans a maximum of 30°. By this, the tensioning device 8 and the tensioning rail 6 are already inclined in the direction of the free chain section 18, which improves the application of the tensioning rail 6 against the chain section 18. The longitudinal axis 13 of the chain tensioning device 8 defines the direction of the movement of the tensioning piston 10.

The tensioning rail 6 is applied with the running surface 23 against the obliquely, vertically extending so-called loose side 18. The loose side need not transfer any load, but runs between the second chain wheel 4 and the first chain wheel 3 in a relaxed manner. By the application against the tensioning rail 6, the chain section 18 adopts a curved shape in the area of the contact surface. The tensioning rail 6 can be moved backwards and forwards by the tensioning device 8 along the direction of movement 21 predefined by the guide contours 12, which are designed as oblong holes 12a, 12b. To tension the chain, the tensioning piston extends upwardly out of the housing 9 of the tensioning device 8 and presses against the operating surface 7 of the tensioning rail 6. Thereupon, the tensioning rail 6 is displaced upwardly, substantially vertically, along the oblong holes 12a, 12b and guided by the bolts 11a, 11b extending therethrough. The direction of the movement 21 of the tensioning rail 6 for tensioning the chain thus corresponds to the moving direction 25 on the loose side 18. When the chain is tensioned or, respectively, when the tensioning rail 6 is displaced upwardly, the distance between the tensioning rail 6 and the first chain wheel 3 is increased. Correspondingly, the distance between the tensioning rail 6 and the second chain wheel 4 is reduced.

The operation of the tensioning device is basically not dependent on the direction of rotation of the traction medium drive. The direction of rotation 22 of the traction medium drive could, therefore, also be counterclockwise, for which purpose the tensioning device could be applied equally. Also, the arrangement of the tensioning device on the traction medium drive is not limited to the assembled positions shown in the embodiments.

The longitudinal axes 28, 29 of the oblong holes 12a, 12b extend substantially parallel with respect to the longitudinal axis 13 of the tensioning piston 10. The longitudinal axes 28, 29 of the oblong holes 12a, 12b as well extend parallel to each other. The tensioning device 8 and the oblong holes 12a, 12b are arranged in such a way that the direction of the movement 21 of the tensioning rail extends substantially in the direction of the second traction medium wheel 4 and in the direction of the traction medium section 18. The traction medium section 18 thus comes into contact with the curved running surface 23 of the tensioning rail 6 substantially over the total length of the tensioning rail 6.

The direction of the movement 21 of the tensioning rail 6 thus is a linear movement towards the chain section 18. To allow a linear displacement of the tensioning rail 6, the two longitudinal axes 28, 29 of the oblong holes 12a, 12b are oriented parallel to one another. The orientation of the oblong holes 12a, 12b may, in this respect, deviate from the longitudinal axis 13 of the tensioning piston 10, depending on the extent of the pressure to be exerted by the tensioning rail against the traction medium section 18 transversely to the longitudinal axis 13 of the tensioning piston 10. Advantageously appears to be an orientation of the oblong holes 12a, 12b in such a way that the lower portion of the tensioning rail 6, i.e. the portion being in the proximity of the tensioning device 8, is tangentially passed towards or applied against the chain section 18.

In the embodiment shown, the at least one sliding guide 11 is formed by at least one bolt 11a, 11b, which extends through the tensioning rail 6.

It would also be possible that the sliding guide 11 is formed of one or more bolts 11a, 11b, respectively, which are mounted on the tensioning rail 6 or are formed on the same integrally, respectively, and which engage into guide contours 12 in the engine block and/or a cover of the chain drive. Also, the sliding guide 11 could alternatively be integrally formed or mounted on the engine block or a cover of the drain drive and act on an outer surface of the tensioning rail 6. The associated guide contour 12 would likewise be arranged on an outer surface of the tensioning rail 6.

The tensioning rail 6 is movable both in the direction of the second traction medium wheel 4 and back in the direction toward the first traction medium wheel 3, whereby it is guided by the bolts 11a, 11b along the oblong holes 12a, 12b. To allow a backward movement to the first traction medium wheel 3, the tensioning device 8 is not provided with a locking mechanism. Also, it is possible to use a tensioning device 8 including a locking mechanism, so that the backward movement of the tensioning rail 6 is limited. Usually, locking mechanisms allow a small retracting and extending movement of the tensioning piston 10. In this operating range a sufficient damping is ensured, while a complete retraction of the tensioning piston is prevented. A backward movement may take place, for example, if the run of the chain 5 is unsteady, that is, if sudden tensions occur, which are transferred to the tensioning rail 6 and thus also act on the tensioning device 8.

In the embodiment shown, the first chain wheel 3 is the driving chain wheel and the second chain wheel 4 is the driven chain wheel. The chain wheels 3, 4 each rotate in the direction of rotation 22, i.e. clockwise, which is why the chain section 16 represents the so-called load side or tight side, respectively, and the chain section 18 represents the reverse motion no-load side (loose side).

As the tensioning rail 6 merely performs a linear movement, other than the generic prior art, no complicated adjustment of the design of the contact surface between the tensioning piston 10 and the operating surface 7 is necessary. Changes to the position or displacements, respectively, between the contact surface of the tensioning piston 10 and the operating surface 7 only occur to a small degree, so that the contact surfaces may be plane or slightly rounded, respectively.

An extreme or maximum position of the tensioner assembly 1 is shown in FIG. 2. The tensioning piston 10 is here extended to its maximum position. Thus, the tensioning rail 6 has adopted its position with a construction-related smallest possible distance toward the second chain wheel 4. The chain section 18 is displaced by a maximum relative to the imaginary connecting line 26 between the first and second traction medium wheels 3, 4. The operating range of the tensioner assembly 1 is defined between the positions of the tensioning rail 6 shown in FIG. 1 and FIG. 2.

The bolts 11a, 11b shown in the embodiment and the associated oblong holes 12a 12b may also be designed as a sliding block guide. Thus, for example, the oblong hole may be designed as a groove with a slide block guided therein. In this case, a second oblong hole could be waived. Moreover, it is possible to also employ the tensioner in traction medium drives in which the first and second traction medium wheels 3, 4 are provided with the same number of teeth 15, or in which the first traction medium wheel 3 is provided with a greater number of teeth than the second traction medium wheel 4. This would apply, for example, if ancillary components of engines were driven or if devices for the balancing of masses in the engine were used. The combination of traction medium wheels having an optional number of teeth 15 would be possible as well.

Below, another embodiment of the tensioner assembly 1 will be introduced. Herein, merely the differences over the above-described embodiment are explained. Like components or identically acting components, respectively, are therefore provided with like reference numbers in both embodiments, and reference is here made to the above description.

Diverging from the above-described embodiment, it is also possible to arrange the tensioning rail 6 to perform both a longitudinal displacement and a rotation (FIG. 3, 4). The tensioning rail 6 as well as the sliding guide 11 and the guide contour 12 are therefore designed in such a way that the tensioning rail 6 performs a non-linear movement 27 as it slides along the sliding guide 11. The tensioning rail 6 follows here a curved path of motion. To this end, the guide contours are, contrary to the above-introduced embodiment, no longer arranged in parallel, but the oblong hole 12b, i.e. the longitudinal axis 29 of the oblong hole 12b, is rather inclined in the direction of the chain section 18. In the embodiment shown, the oblong hole 12a is oriented in parallel to the longitudinal axis 13 of the tensioning piston 10, but may also be oriented irrespectively of the longitudinal axis 13 of the tensioning piston 10 and the second oblong hole 12b. Specifically, it is also possible that the second oblong hole 12b is inclined in the direction of the traction medium section and that an angle between the longitudinal axis 13 of the tensioning piston 10 and the longitudinal axis 29 of the second oblong hole 12b comes up to 90°. If the tensioning piston 10 is extended out of the housing 9, therefore, a combined direction of movement 21 is obtained, which extends both in the direction of the second traction medium wheel 14 and the direction of the chain section 18. Diverging from the pivotable tensioning rails known from the prior art, the pivot point 24 is now provided in the proximity of the tensioning device 8 in the bolt 11. The end of the tensioning rail 6 spaced away from the chain tensioning device 8 thus performs a larger rotational movement than the end of the tensioning rail 6 applied against the chain tensioning device 8.

The shape of the tensioning rail 6 illustrated in the second embodiment according to FIGS. 3 and 4 differs from the shape described in the first embodiment. As the tensioning rail 6 now performs a pivoting movement in the upper portion at the level of the oblong hole 12b and, therefore, travels a larger distance as compared to the first embodiment, also a more intensive displacement of the chain section 18 is obtained, in the direction of the imaginary connecting line 26 between the first and second traction medium wheels 3, 4 or beyond the same, respectively.

FIG. 4 shows the second embodiment of the tensioner in a maximum position. The tensioning piston 10 is completely extended, and the bolts 11a, 11b have reached their end position in the oblong holes 12a, 12b, that is, have reached the end of the respective oblong holes.

In both embodiments of the tensioner assembly 1 the formation of a restraint system is possible on the basis of the design of the oblong holes 12a, 12b. The tensioning rail 6 can be restrained in its respective position, for example, by a step-like design of the oblong holes 12a, 12b.

The assembly illustrated in the figures shows an internal combustion engine with a crankshaft and a camshaft mounted in parallel above each other. In an inclined assembled position of the engine, that is, if the connecting line 26 between the first and second chain wheels 3, 4 does not extend vertically, or if the tensioner is used in a V-engine, the tensioner can be equally applied and the statements set forth remain valid. Within the scope of the aforementioned possible modifications the arrangement of the individual components with respect to each other remains the same. Thus, the terms horizontal and vertical lines are to comprehended in terms of coordinate axes, which can be spatially rotated together with the traction medium assembly.

The invention claimed is:

1. Tensioner assembly for a traction medium drive, specifically a chain drive, with at least two traction medium wheels and a flexible traction medium, comprising a tensioning rail which can be pressed against the traction medium by means of a tensioning device having a tensioning piston that is extendable relative to the tensioning device along a longitudinal direction, characterized in that the tensioning rail is applied against at least one sliding guide along the longitudinal direction and can be displaced along the at least one sliding guide by means of the tensioning device which is disposed in extension of the tensioning rail, wherein the tensioning device is arranged such that the longitudinal direction deviates in an assembled position by a maximum angle of 30° relative to a connecting line defined between two center points of the at least two traction medium wheels between which the tensioning rail is acting, wherein the tensioning rail comprises an operating surface and the tensioning device comprises a housing and the tensioning piston, wherein the tensioning piston acts on the operating surface, and wherein the first traction medium wheel is smaller than the second traction medium wheel, the tensioning device is arranged at the level of the first traction medium wheel and that, by extending the tensioning piston of the tensioning device out of the housing, the tensioning rail can be pressed away from the first traction medium wheel in the direction of the second traction medium wheel.

2. Tensioner assembly for a traction medium drive, specifically a chain drive, with at least two traction medium wheels and a flexible traction medium, comprising a tensioning rail which can be pressed against the traction medium by means of a tensioning device having a tensioning piston that is extendable relative to the tensioning device along a longitudinal direction, characterized in that the tensioning rail is applied against at least one sliding guide along the longitudinal direction and can be displaced along the at least one sliding guide by means of the tensioning device which is disposed in extension of the tensioning rail, wherein the tensioning device is arranged such that the longitudinal direction deviates in an assembled position by a maximum angle of 30° relative to a connecting line defined between two center points of the at least two traction medium wheels between which the tensioning rail is acting, wherein the at least one sliding guide is formed by a bold and wherein two sliding guides each extend through an oblong hole incorporated in the tensioning rail, with the first oblong hole being provided in the proximity of the tensioning device and the second oblong hole being provided away from the tensioning device.

3. Tensioner assembly according to claim 2, wherein at least the first oblong hole is oriented parallel to the longitudinal axis of the tensioning piston.

4. Tensioner assembly according to claim 2, wherein the orientation of the second oblong hole with respect to the longitudinal axis of the tensioning piston deviates from that of the first oblong hole.

5. Tensioner assembly according to claim 4, wherein the second oblong hole is inclined in the direction of the traction medium and that an angle defined between the longitudinal axis of the tensioning piston and the second oblong hole measures at most.

6. Tensioner assembly according to claim 3, wherein the first oblong hole is substantially aligned with the longitudinal axis of the tensioning piston.

* * * * *